J. M. COLLIER.
GRINDING-MILL.
No. 173,846. Patented Feb. 22, 1876.
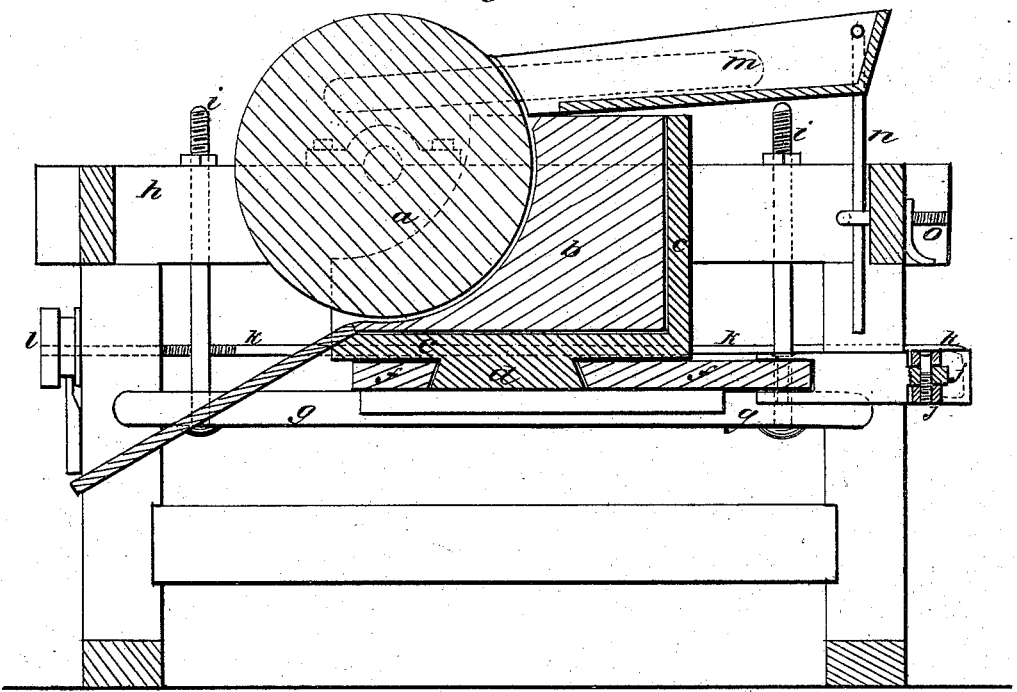
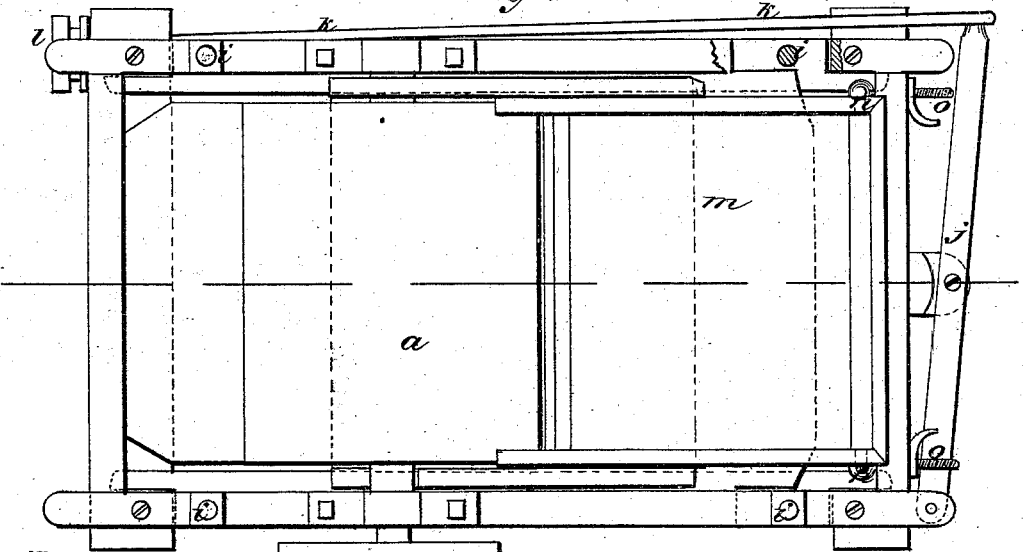
WITNESSES:
Francis McArdle
John Goethals
INVENTOR:
J. M. Collier
BY
ATTORNEYS.

UNITED STATES PATENT OFFICE.

JAMES M. COLLIER, OF GADSDEN, ALABAMA.

IMPROVEMENT IN GRINDING-MILLS.

Specification forming part of Letters Patent No. 173,846, dated February 22, 1876; application filed January 15, 1876.

*To all whom it may concern:*

Be it known that I, JAMES M. COLLIER, of Gadsden, Etowah county, Alabama, have invented a new and Improved Grinding-Mill, of which the following is a specification:

My invention consists of a contrivance for adjusting, holding, and regulating a concave bed-stone to a revolving cylinder, and as hereinafter described.

Figure 1 is a longitudinal sectional elevation of my improved grinding-mill, taken on line $x\ x$, Fig. 2; and Fig. 2 is a plan view.

Similar letters of reference indicate corresponding parts.

$a$ is the revolving cylinder, and $b$ the stationary concave bed-stone, the latter being arranged in a case, C, which is connected by a center dovetail pivot, $d$, with the adjusting-base $f$, by which the bed-stone is adjusted to the runner, the object of the pivot being to allow the bed-stone to adjust itself to the other. The base $f$ is mounted on supports $g$, which are suspended from the top of the frame $h$ by screw-rods $i$, by which the bed-stone is adjusted to the runner as to height and for a uniform contact of the faces, and the base is arranged on said supports to slide toward and from the runner for regulating the stones for grinding fine or coarse. The lever $j$, rod $k$, and adjusting-nut $l$, are employed for shifting the base and the bed-stone. The hopper $m$ is supported at the rear by the adjusting-rods $n$ and clamp-screws $o$ for regulating the feed.

Having thus described my invention, I claim as new and desire to secure by Letters Patent—

1. The concave bed-stone $b$ arranged in case C, pivoted to the adjusting-bed $f$, substantially as specified.

2. The combination of adjusting-base $f$, case C, bed-stone $b$, and revolving cylinder $a$, substantially as specified.

3. The adjusting-supports $g$, and rods $i$, combined with base $f$, bed-stone $b$, and revolving stone $a$, substantially as specified.

4. The lever $j$, rod $k$, and adjusting nut $l$, combined with adjusting-base $f$, bed-stone $b$, and revolving stone $a$, substantially as specified.

5. The hopper $m$, adjusting-rods $n$, and clamp-screws $o$, combined with revolving stone $a$, substantially as specified.

JAMES MADISON COLLIER.

Witnesses:
   JOHN G. S. SMITH,
   BENJAMIN F. HODGES.